United States Patent
Zelenov et al.

(10) Patent No.: US 11,086,527 B1
(45) Date of Patent: *Aug. 10, 2021

(54) PRE-FETCHING DATA BASED ON MEMORY USAGE PATTERNS

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 86 days.

This patent is subject to a terminal disclaimer.

(21) Appl. No.: 16/259,001

(22) Filed: Jan. 28, 2019

Related U.S. Application Data

(63) Continuation of application No. 15/395,916, filed on Dec. 30, 2016, now Pat. No. 10,228,864.

(51) Int. Cl.
*G06F 12/00* (2006.01)
*G06F 13/00* (2006.01)
*G06F 3/06* (2006.01)

(52) U.S. Cl.
CPC ............ *G06F 3/0611* (2013.01); *G06F 3/064* (2013.01); *G06F 3/0659* (2013.01); *G06F 3/0664* (2013.01); *G06F 3/0685* (2013.01)

(58) Field of Classification Search
CPC ...... G06F 3/0611; G06F 3/064; G06F 3/0659; G06F 3/0664; G06F 3/0685
USPC ........................................................ 711/154
See application file for complete search history.

(56) References Cited

U.S. PATENT DOCUMENTS

| | | | | |
|---|---|---|---|---|
| 6,006,307 | A * | 12/1999 | Cherukuri | G11C 29/74 711/114 |
| 10,228,864 | B1 * | 3/2019 | Zelenov | G06F 12/0862 |
| 2003/0093312 | A1 * | 5/2003 | Ukita | G06Q 30/02 705/7.29 |
| 2004/0064668 | A1 * | 4/2004 | Kjos | G06F 12/1027 711/202 |
| 2007/0070764 | A1 * | 3/2007 | Miyamoto | G11C 11/22 365/222 |

(Continued)

OTHER PUBLICATIONS

USPTO, Office Action for U.S. Appl. No. 15/395,916, dated Apr. 20, 2018.

(Continued)

*Primary Examiner* — Sheng Jen Tsai
(74) *Attorney, Agent, or Firm* — Rosenberg, Klein & Lee

(57) ABSTRACT

Systems and methods for pre-fetching data based on memory usage patterns. An example method comprises: receiving a first memory access request identifying a first memory block; receiving a second memory access request identifying a second memory block; update a memory access tracking data structure by incrementing a sequence counter corresponding to a memory access sequence that references the first memory block and the second memory block; receive a third memory access request identifying a third memory block; identifying, based on the memory access tracking data structure, a sequence counter having a maximal value among sequence counters associated with memory access sequences that reference the third memory block; and pre-fetching a fourth memory block corresponding to the identified sequence counter.

20 Claims, 5 Drawing Sheets

(56) References Cited

U.S. PATENT DOCUMENTS

| | | | |
|---|---|---|---|
| 2010/0268661 A1* | 10/2010 | Levy | G06Q 30/02 |
| | | | 705/347 |
| 2011/0219169 A1* | 9/2011 | Zhang | G06F 3/061 |
| | | | 711/103 |
| 2011/0219222 A1* | 9/2011 | Eichenberger | G06F 9/32 |
| | | | 712/241 |
| 2012/0047312 A1* | 2/2012 | Nathuji | G06F 9/3832 |
| | | | 711/6 |
| 2014/0164712 A1* | 6/2014 | Takamura | G06F 12/0862 |
| | | | 711/137 |
| 2015/0220529 A1* | 8/2015 | Eltabakh | G06F 16/182 |
| | | | 707/719 |
| 2016/0092133 A1* | 3/2016 | Shimizu | G06F 3/0673 |
| | | | 711/163 |
| 2016/0350549 A1* | 12/2016 | Hampel | G06F 21/755 |
| 2017/0060455 A1* | 3/2017 | Deshmukh | G06F 3/067 |

OTHER PUBLICATIONS

USPTO, Final Office Action for U.S. Appl. No. 15/395,916, dated Jul. 25, 2018.
USPTO, Advisory Action for U.S. Appl. No. 15/395,916, dated Sep. 24, 2018.
USPTO, Notice of Allowance for U.S. Appl. No. 15/395,916, dated Oct. 29, 2018.

* cited by examiner

PRE-FETCHING DATA BASED ON MEMORY USAGE PATTERNS

RELATED APPLICATIONS

This application is a continuation of U.S. patent application Ser. No. 15/395,916 filed on Dec. 30, 2016, entitled "Pre-fetching Data Based on Memory Usage Patterns," the entire content of which is incorporated by reference herein.

TECHNICAL FIELD

The present disclosure is generally related to computer systems, and is specifically related to systems and methods for pre-fetching data based on memory usage patterns.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor," above the hardware and below the virtual machines. The virtual machine monitor may abstract the physical layer and present this abstraction to virtual machines to use, by providing interfaces between the underlying hardware and virtual devices of virtual machines. For example, processor virtualization may be implemented by the virtual machine manager scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
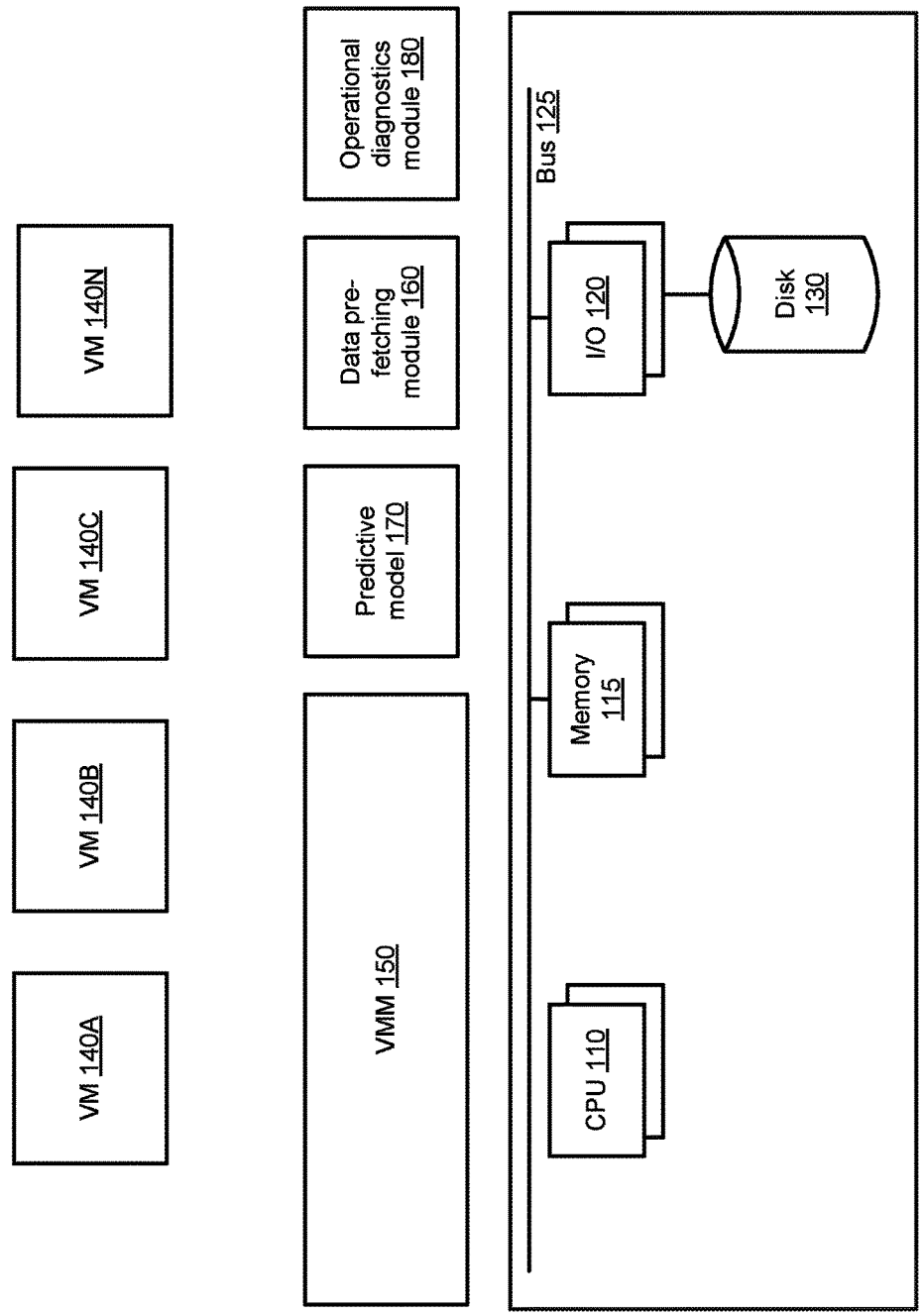
FIG. 1 depicts a high-level diagram of an example computer system 100 in which the example methods of pre-fetching data based on memory usage patterns may be implemented, in accordance with one or more aspects of the present disclosure.

Described herein are systems and methods for pre-fetching data based on memory usage patterns.

A virtual execution environment implemented by a host computer system may comprise a virtual machine monitor (VMM) facilitating execution of one or more virtual machines, each of which may run a guest OS managing one or more applications. The VMM may emulate the underlying hardware platform (e.g., the x86 platform), including emulating the processor, memory, and peripheral devices (such as network interface controllers, hard disk controllers, etc.).

During its lifetime, a virtual machine may access various memory devices, including volatile (e.g., random access memory (RAM)) and/or non-volatile (e.g. disks) memory devices. The operational efficiency of the virtual machine may be improved by pre-fetching, based on an output of a predictive model, the next memory block to be accessed. "Memory block" herein shall refer to an addressable unit of memory, such as a memory page identified by its page number, a disk block identified by its block number, or a disk file identified by its file name.

Implementing the predictive model may involve observing and recording memory usage patterns by one or more memory accessing agents (represented, e.g., by one or more virtual machines). In an illustrative example, the operational efficiency of a memory accessing agent may be enhanced based on a predictive model that reflects the individual memory usage pattern of the agent. In another illustrative example, the memory usage patterns of a group of memory accessing agents may be observed and recorded for producing a predictive model to be utilized for enhancing the operational efficiency of one or more agents comprised by the group.

The predictive model may utilize a memory access tracking data structure, which in an illustrative example may be provided by a rectangular matrix, the elements of which represent sequence counters reflecting two-block memory access sequences. The first memory block referenced by the sequence is identified by the row number, the second memory block referenced by the sequence is identified by the column number, and the matrix element residing at the intersection of the row and the column represents the count of observed memory access sequences in which the first memory block was followed by the second memory block.

Training the predictive model may involve observing the memory usage by one or more memory accessing agents of a chosen group. Responsive to observing a memory access sequence, the method may increment the matrix element that resides at the intersection of a row the number of which is derived from the identifier of the first memory block of the observed sequence and a column the number of which is derived from the identifier of the second memory block of the observed sequence.

In operation, responsive to receiving a memory access request referencing a certain memory block, the method may identify the matrix row the number of which corresponds to the memory block identifier. The method may then identify the element having the maximal value among the elements of the matrix row. The column of the maximal element identifies the memory block that, based on the recorded observations, has the highest probability of being accessed following the access to the current memory block, i.e. the memory block identified by the row number. Therefore, the method may pre-fetch the predicted memory block identified by the column of the maximal element among the elements of the row. In various illustrative examples, the method may read the identified disk block or file or access the identified memory page.

In certain implementations, the predictive model may be utilized for operational diagnostics of the memory accessing agents. In an illustrative example, a significant difference between actual memory access patterns by a certain memory accessing agent and the model predictions may indicate an operational issue such as malware activity, configuration error, hardware failure, resource usage policy violation, etc., as described in more detail herein below.

Thus, the systems and methods described herein represent improvements to the functionality of general purpose or specialized computing devices, by utilizing predictive models to pre-fetch memory blocks, as described in more detail herein below. The systems and methods described herein may be implemented by hardware (e.g., general purpose and/or specialized processing devices, and/or other devices and associated circuitry), software (e.g., instructions executable by a processing device), or a combination thereof. While the examples presented herein describe virtual machines operating as memory accessing agents, non-virtualized memory agents also fall within the scope of this disclosure. Various aspects of the above referenced methods and systems are described in details herein below by way of examples, rather than by way of limitation.

FIG. 1 depicts a high-level diagram of an example computer system 100 in which memory access predictive models and data pre-fetching may be implemented in accordance with one or more aspects of the present disclosure. The computer system 100 may include one or more central processing units (CPU) 110, also referred to as "processors" herein, which may be communicatively coupled to one or more memory devices 115 and one or more input/output (I/O) devices 120 via a system bus 125. In an illustrative example, an I/O device 120 may represent a disk controller that facilitated communications of processor 110 and other components with one or more disks 130.

"Processor" herein refers to a device capable of executing instructions handling data in registers or memory, encoding arithmetic, logical, control flow, floating point or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device capable of inputting and/or outputting binary data. In an illustrative example, an I/O device may be provided by a network interface controller (NIC) or a block I/O device, such as a hard disk controller.

In accordance with one or more aspects of the present disclosure, the computer system 100 may implement a virtual execution environment for executing code that may have been originally developed for other platforms. The virtual execution environment may comprise one or more virtual machines 140A-140N, each of which may run a guest OS managing one or more applications. Lifecycles of the virtual machines 140A-140N may be managed by the VMM 150.

During its lifetime, a virtual machine 140 may access various memory devices, including volatile (e.g., random access memory (RAM) 115) and/or non-volatile (e.g. disks 130) memory devices. In accordance with one or more aspects of the present disclosure, the operational efficiency of the virtual machine may be improved by employing the data pre-fetching module 160 to pre-fetch, based on an output of the predictive model 170, the next memory block to be accessed.

In various illustrative examples, the predictive model 170 may comprise one or more models utilizing one or more memory access tracking data structures. The data pre-fetching module 160 may be implemented as a kernel-mode driver, a userspace application, or using other suitable architectural paradigms.

Implementing the predictive model may involve observing and recording memory usage patterns by one or more memory accessing agents (represented, e.g., by the virtual machines 140A-140N). Memory access requests issued by the memory accessing agents may be intercepted by a virtual memory driver, a disk driver, a virtual machine manager, or another suitable software or hardware component.

Even though a single predictive model is shown in FIG. 1 for clarity, in certain implementations, a dedicated predictive model may be provided for each of the virtual machines 140A-140N to reflect the individual memory usage pattern of the particular virtual machine. Alternatively, a predictive model may be provided for a group of two or more virtual machines 140. The group may include a plurality of virtual machines 140 that perform similar functions (e.g., remote desktop clients that are utilized by users having similar organizational roles). Alternatively, the group may include a plurality of virtual machines 140 sharing a common software configuration. In various illustrative examples, other grouping criteria may be applied to split the virtual machines 140 into several groups such that each group would be associated with a corresponding predictive model.

Figure 2:
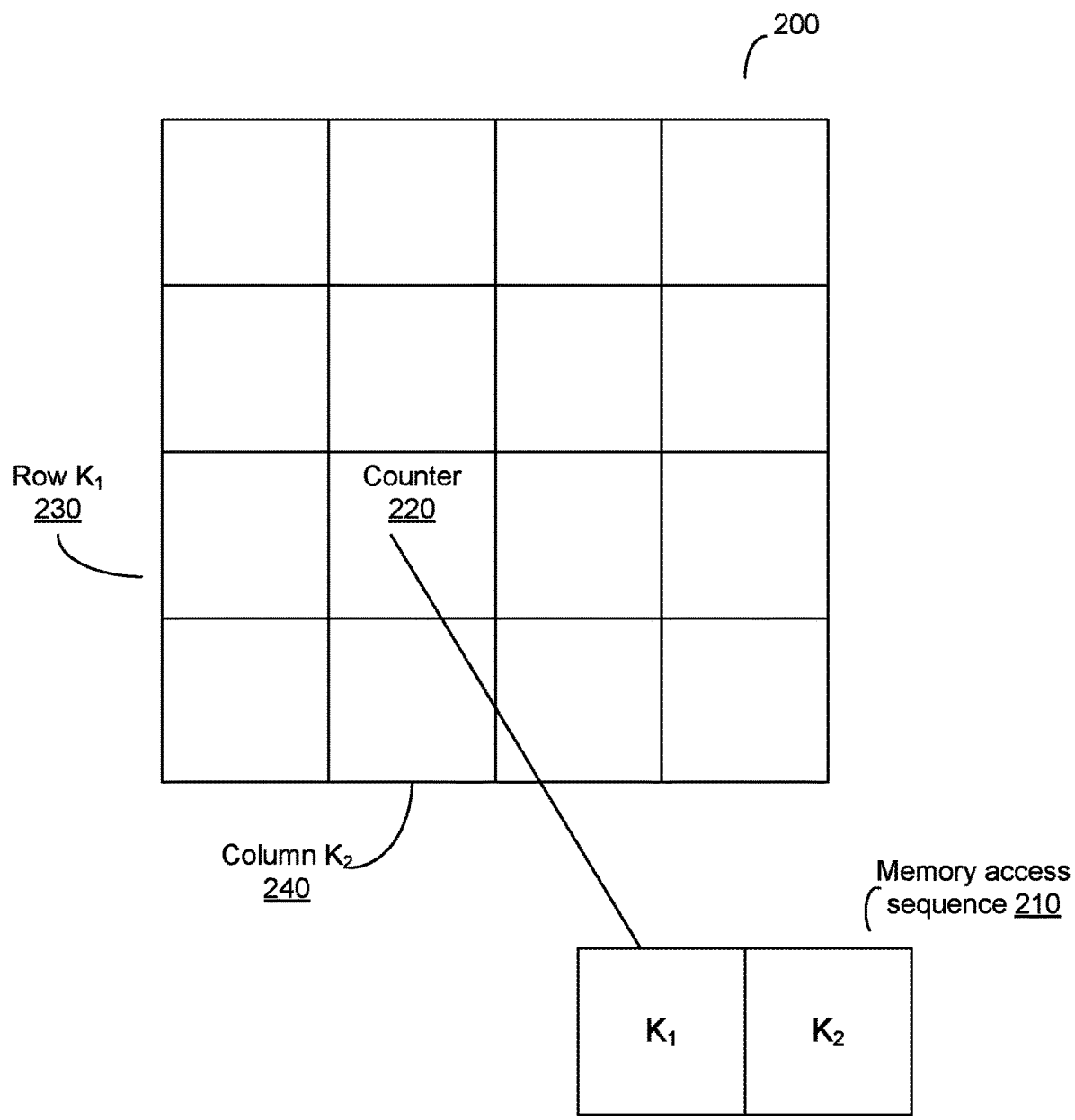
FIG. 2 schematically illustrates an example memory access tracking data structure utilized by methods of pre-fetching data based on memory usage patterns, in accordance with one or more aspects of the present disclosure.

The predictive model 170 may utilize a memory access tracking data structure, which is schematically illustrated by FIG. 2. In the illustrative example of FIG. 2, the memory access tracking data structure is represented by a rectangular matrix 200. Each element of the matrix 200 represents a sequence counter reflecting the number of observations of the corresponding memory access sequence during the model lifetime or training period. For a matrix element residing at the intersection of a row and a column, the row number identifies the first memory block referenced by the sequence, the column number identifies the second memory block referenced by the sequence, and the matrix element stores the count of observed memory access sequences in which the first memory block was followed by the second memory block. Thus, a memory access sequence 210 comprising blocks $(K_1, K_2)$ would be represented by the counter 220 which is stored by the matrix element identified by the row 230, the number of which is derived from the identifier of block $K_1$, and the column 240 the number of which is derived from the identifier of block $K_2$.

As noted herein above, the term "memory block" shall be broadly interpreted herein to refer to an addressable unit of memory. In an illustrative example, a memory block may be represented by a memory page, and may thus be identified by the page number or physical address of the frame. Alternatively, a memory block may be represented by a disk block, and thus may be identified by the disk block number. Alternatively, a memory block may be represented by a file, and thus may be identified by the file name.

The memory block identifier may be translated, by a pre-defined transformation (e.g., hashing the file name using a pre-defined hash function or shifting the memory address by a pre-defined number of bits), into the position identifier (e.g., row number or column number) in the memory access tracking data structure. In certain implementation, the untransformed memory block identifier may be directly utilized as the position identifier in the memory access tracking data structure.

Training the predictive model may involve observing the memory usage by one or more memory accessing agents of a chosen group (e.g., a group of two or more virtual machines, as described in more detail herein above). Responsive to observing a memory access sequence, the method may increment the element of the matric 200 that resides at the intersection of a row the number of which is derived from the identifier of the first memory block of the observed sequence and a column the number of which is derived from the identifier of the second memory block of the observed sequence.

"Training period of a predictive model" herein shall refer to the period in which the predictive model is being trained, i.e., the memory access tracking data structure is being updated based on observing memory access sequences. "Lifetime of the predictive model" herein shall refer to the period in which the predictive model is used for its intended purpose (data pre-fetching and/or issue diagnostics). In certain implementations, the training period of the predictive model may be equal to its lifetime, which in turns may coincide with the lifetime of the associated one or more memory accessing agents (e.g., a group of virtual machines). Alternatively, the training phase may be terminated at some point in the model lifetime, thus preventing the model from the future updates and therefore preserving the model unchanged for the remainder of its lifetime.

In certain implementations, the predictive model may be refreshed by resetting certain counters of the memory access tracking data structure 200. Certain triggering conditions may be evaluated for identifying one or more counters to be reset. In an illustrative example, a pre-defined timeout may be associated with a counter or a group of counters, such that the timeout is set every time the associated counter (e.g., a member of the group of counters) is updated, and the timeout expiration would trigger resetting the associated counter or group of counters. In another illustrative example, one or more counters comprised by at least part of the memory access tracking data structure 200 may be reset responsive to detecting significant differences between the model predictions and actual memory access patterns by the associated accessing agents. The resetting threshold may be specified by the number of consecutive mispredictions with respect to a counter of a group of counters.

Figure 3:
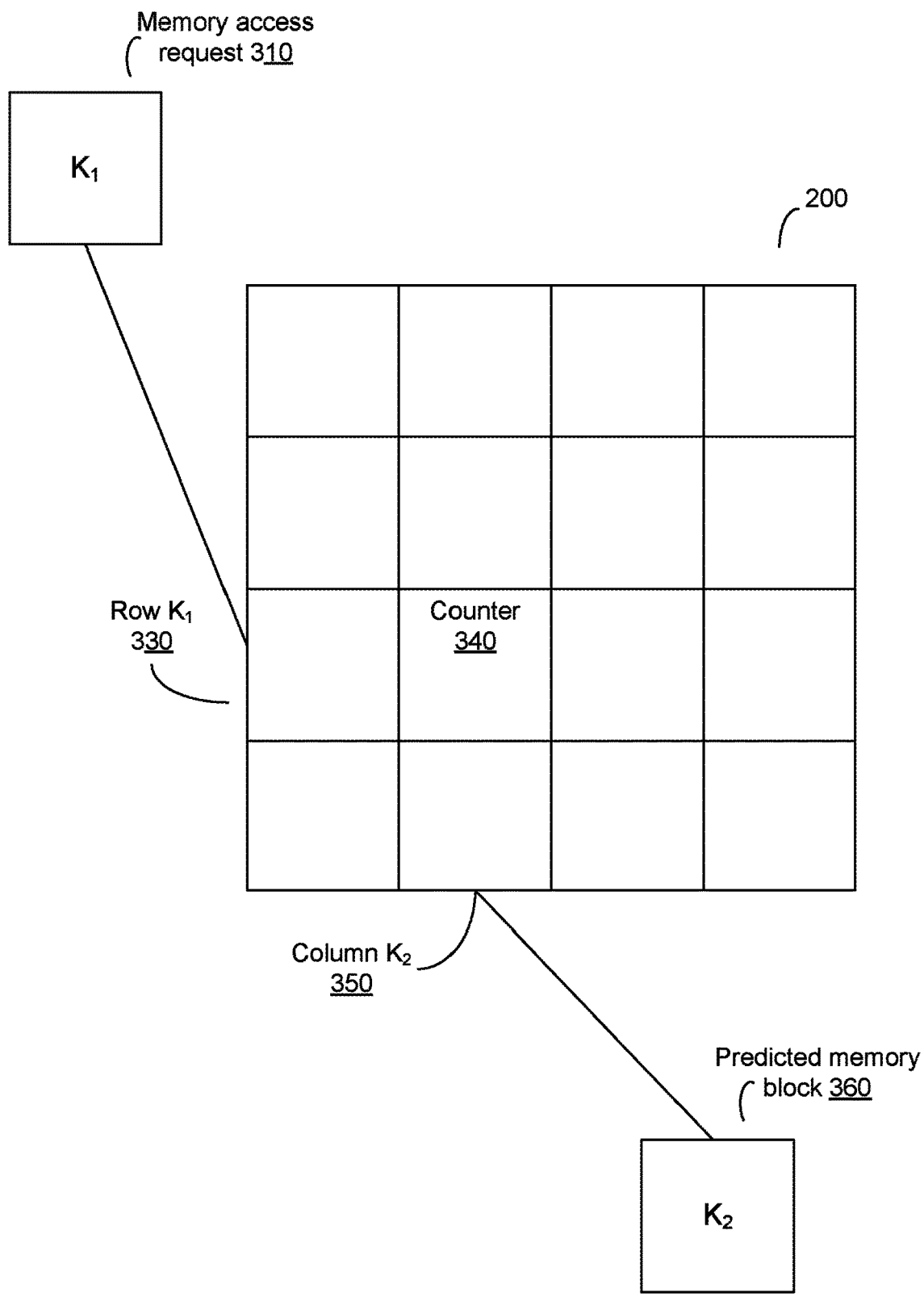
FIG. 3 schematically illustrates operation of the predictive model in accordance with one or more aspects of the present disclosure.

FIG. 3 schematically illustrates operation of the predictive model in accordance with one or more aspects of the present disclosure. In the illustrative example of FIG. 3, the method receives a memory access request 310. The predictive model may identify the row 330 of the matrix 200 such that the row number corresponds to the identifier of the memory block specified by the memory access request 310. The predictive model may then identify the element 340 having the maximal value among the elements of the row 330. The column 350 of the maximal element 340 identifies the memory block 360 that, based on the recorded observations, has the highest probability of being accessed following the access to the current memory block 320, i.e. the memory block identified by the row number. Therefore, the method may pre-fetch the predicted memory block 360 identified by the column 350 of the maximal element 340 among the elements of the row 330. In various illustrative examples, the method may read the identified disk block or access the identified memory page.

In certain implementations, the predictive model may be based on memory access sequences representing three or more consecutive memory access operations with respect to three or more memory blocks. Accordingly, the memory access tracking data structure utilized by the predictive model may be represented by a multi-dimensional array that stores a plurality of sequence counters. The number of dimensions of the array is determined by the chosen number of memory access operations in the observable memory access sequences. The position of the sequence counter corresponding to the memory access sequence may be identified by a vector, the elements of which are represented by values derived from the identifiers of memory blocks referenced by the memory access sequence. In an illustrative example, a memory access sequence comprising blocks ($K_1$, $K_2$, $K_3$) would be represented by the counter which is stored by the data structure element the indices of which are derived from the identifiers of block $K_1$, $K_2$, and $K_3$, respectively.

In certain implementations, the memory access tracking data structure may be represented by a sparse array, i.e., an array having a large ratio of the number of elements having the default value (e.g., zero) to the total number of array elements. In certain implementations, the memory usage efficiency may be traded off for array access efficiency and the memory access tracking data structure may be implemented by a multi-dimensional array. Conversely, when the memory usage efficiency becomes a critical factor, the memory access tracking data structure may be implemented using linked lists, bitmaps, and/or other methods of implementing sparse arrays.

In an illustrative example, the memory access tracking data structure may be implemented by one or more linked lists that only store the elements having non-default values (e.g., non-zero elements). Such a linked list may include a plurality of elements linked to each other, such that each element of the list includes the position identifier (e.g., row and column indices), the element value, and at least one pointer to the next array element (e.g., a first pointer referencing the next element in the same row and a second pointer referencing the same element in the same column).

In certain implementations, the predictive model may be utilized for operational diagnostics of the memory accessing agents (e.g., virtual machines). In an illustrative example, a significant difference between actual memory access patterns by a certain memory accessing agent and the model predictions may indicate an operational issue such as malware activity, configuration error, hardware failure, resource usage policy violation, etc. The threshold difference between actual memory access patterns and the model predictions may be specified by the number of consecutive mispredictions with respect to a counter of a group of counters.

Figure 4:
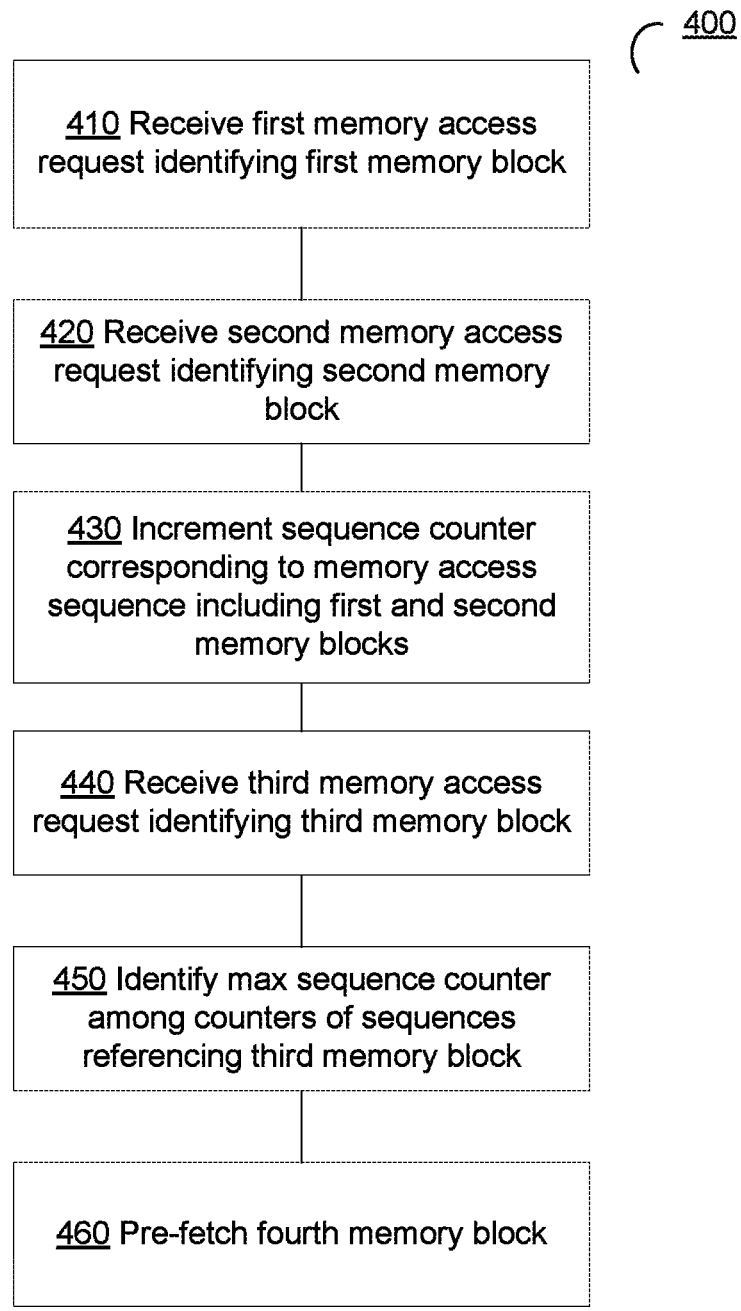
FIG. 4 depicts a flow diagram of an example method of pre-fetching data based on memory usage patterns, in accordance with one or more aspects of the present disclosure.

FIG. 4 depicts a flow diagram of an example method 400 of pre-fetching data based on memory usage patterns, in accordance with one or more aspects of the present disclosure. The method 400 and/or each of its individual functions, routines, subroutines, or operations may be performed by one or more processing devices of the computer system (e.g., computer system 100 of FIG. 5) implementing the method. In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing method 400 may be executed asynchronously with respect to each other.

At block 410, a processing device implementing the method may receive a first memory access request identifying a first memory block in a memory of a computer system. The first memory block may be represented by a memory page, a disk block, or a disk file. Therefore, the memory access request may be intercepted by a virtual memory driver, a disk driver, or a virtual machine manager, as described in more detail herein above.

At block 420, the processing device may receive a second memory access request identifying a second memory block. The second memory block may be represented by a memory page, a disk block, or a disk file. Therefore, the memory access request may be intercepted by a virtual memory driver, a disk driver, or a virtual machine manager, as described in more detail herein above.

At block 430, the processing device may update a memory access tracking data structure by incrementing a sequence counter corresponding to a memory access sequence that references the first memory block and the second memory block. In an illustrative example, the memory access sequence references the second memory block as immediately following the first memory block.

In an illustrative example, the memory access tracking data structure may be provided by a rectangular matrix storing a plurality of sequence counters. The matrix may be indexed by the values derived from the identifiers of the first and second memory blocks, such that a sequence counter corresponding to a certain memory access sequence resides at the intersection of the row the number of which is derived from the identifier of the first memory block and the column the number of which is derived from the identifier of the second memory block, as described in more detail herein above.

In another illustrative example, the memory access tracking data structure may be provided by a multi-dimensional array storing a plurality of sequence counters. The array may be indexed by the values derived from the identifiers of the memory blocks referenced by the memory access sequence, such that the position of a sequence counter corresponding to a certain memory access sequence may be identified by a vector, the elements of which are represented by values derived from the identifiers of memory blocks referenced by the memory access sequence.

At block 440, the processing device may receive a third memory access request identifying a third memory block. The third memory block may be represented by a memory page, a disk block, or a disk file. Therefore, the third memory access request may be intercepted by a virtual memory driver, a disk driver, or a virtual machine manager, as described in more detail herein above.

At block 450, the processing device may identify, within the memory access tracking data structure, the sequence counter having the maximal value among the sequence counters associated with memory access sequences that reference the third memory block. In an illustrative example, the processing device may identify the element having the maximal value among the elements of the matrix row representing the third memory block. The column of the maximal element identifies the fourth memory block that, based on the past observations, has the highest probability of being accessed following the access to the third memory block.

At block 460, the processing device may pre-fetch the fourth memory block represented by the identified sequence counter. In various illustrative examples, the method may read the identified disk block or file or access the identified memory page. Responsive to completing operations referenced by block 460, the method may terminate.

Figure 5:
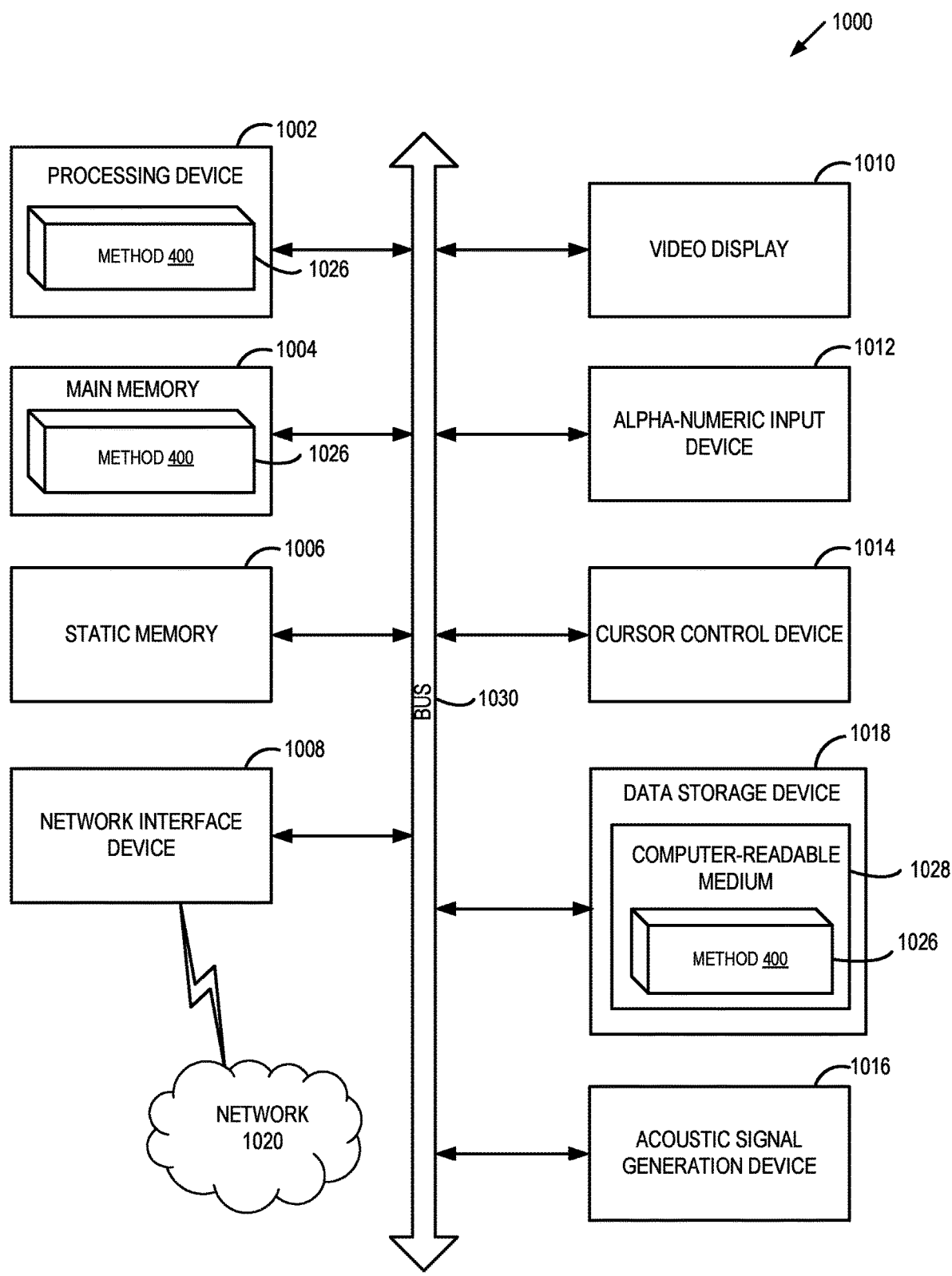
FIG. 5 depicts a block diagram of an example computer system operating in accordance with one or more aspects of the present disclosure.

FIG. 5 schematically illustrates a component diagram of an example computer system 1000 which may perform any one or more of the methods described herein. In various illustrative examples, the computer system 1000 may represent the example computer system 100 of FIG. 1.

The example computer system 1000 may be connected to other computer systems in a LAN, an intranet, an extranet, and/or the Internet. The computer system 1000 may operate in the capacity of a server in a client-server network environment. The computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

The computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 1002 may be configured to execute instructions implementing the method 300 of processing virtual machine I/O requests by virtualization extension modules.

The computer system 1000 may further comprise a network interface device 1008, which may be communicatively coupled to a network 1020. The computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

The data storage device 1018 may include a computer-readable storage medium (or more specifically a non-transitory computer-readable storage medium) 1028 on which is stored one or more sets of executable instructions 1026. In accordance with one or more aspects of the present disclosure, the executable instructions 1026 may comprise executable instructions encoding various functions of the method 400 of pre-fetching data based on memory usage patterns.

The executable instructions 1026 may also reside, completely or at least partially, within the main memory 1004 and/or within the processing device 1002 during execution thereof by the computer system 1000, the main memory 1004 and the processing device 1002 also constituting computer-readable storage media. The executable instructions 1026 may further be transmitted or received over a network via the network interface device 1008.

While the computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a processing device, a number of sequential memory access requests, each memory access request identifying a memory block by a memory block identifier;
incrementing, in a memory access tracking data structure represented by a multi-dimensional array storing a plurality of sequence counters where the number of dimensions of the multi-dimensional array is determined by the number of memory access requests within the sequential memory access requests, a first sequence counter corresponding to a memory access sequence identified by an index vector, where elements of the index vector are derived from each memory block identifier of each memory block accessed by a memory access request within the sequential memory access requests;
receiving a further memory access request identifying a further memory block;
identifying, based on the memory access tracking data structure, a second sequence counter having a maximal value among sequence counters associated with memory access sequences that reference the further memory block; and
pre-fetching another memory block corresponding to the second sequence counter independent of retrieving the further memory block; wherein
the number of memory access requests and number of dimensions of the multi-dimensional array are equal to or greater than 2.

2. The method of claim 1, wherein
the memory access tracking data structure is implemented by a sparse array.

3. The method of claim 1, wherein
each memory block is provided by one of a block of a volatile memory or a block of a non-volatile memory.

4. The method of claim 1, further comprising:
responsive to evaluating a triggering condition, updating the memory access tracking data structure by resetting the first sequence counter.

5. The method of claim 1, wherein
at least one of:
each memory block is provided by one of a memory page, a disk block, or a disk file; and
each memory block identifier comprises one of a memory page number, a disk block identifier, or a file name hash.

6. The method of claim 1, further comprising:
detecting an operational issue associated with a memory accessing agent by evaluating, using the memory access tracking data structure, a memory usage pattern by the memory accessing agent.

7. A computer system, comprising:
a memory; and
a processing device coupled to the memory, the processing device configured to:
receive a number of sequential memory access requests, each memory access request identifying a memory block by a memory block identifier;
increment, in a memory access tracking data structure represented by a multi-dimensional array storing a plurality of sequence counters where the number of dimensions of the multi-dimensional array is determined by the number of memory access requests within the sequential memory access requests, a first sequence counter corresponding to a memory access sequence identified by an index vector, where elements of the index vector are derived from each memory block identifier of each memory block accessed by a memory access request within the sequential memory access requests;
receive a further memory access request identifying a further memory block;
identify, based on the memory access tracking data structure, a second sequence counter having a maximal value among sequence counters associated with memory access sequences that reference the further memory block; and
pre-fetch another memory block corresponding to the second sequence counter independent of retrieving the further memory block; wherein
the number of memory access requests and number of dimensions of the multi-dimensional array are equal to or greater than 2.

8. The computer system of claim 7, wherein
at least one of:
the memory access sequence references each memory block of the memory access sequence after an initial memory block of the memory access sequence immediately after a preceding memory block of the memory access sequence; and
each memory block is provided by one of a block of a volatile memory or a block of a non-volatile memory.

9. The computer system of claim 7, wherein
the processing device is further configured to:
responsive to evaluating a triggering condition, update the memory access tracking data structure by resetting the first sequence counter.

10. The computer system of claim 7, wherein
at least one of:
each memory block is provided by one of a memory page, a disk block, or a disk file; and
each memory block identifier comprises one of a memory page number, a disk block identifier, or a file name hash.

11. A non-transitory computer-readable storage medium comprising executable instructions that, when executed by a processing device, cause the processing device to:
receive, by the processing device, a number of sequential memory access requests, each memory access request identifying a memory block by a memory block identifier;
increment, in a memory access tracking data structure represented by a multi-dimensional array storing a plurality of sequence counters where the number of dimensions of the multi-dimensional array is determined by the number of memory access requests within the sequential memory access requests, a first sequence counter corresponding to a memory access sequence identified by an index vector, where elements of the index vector are derived from each memory block identifier of each memory block accessed by a memory access request within the sequential memory access requests;
receive a further memory access request identifying a further memory block;
identify, based on the memory access tracking data structure, a second sequence counter having a maximal value among sequence counters associated with memory access sequences that reference the further memory block; and
pre-fetch another memory block corresponding to the second sequence counter independent of retrieving the further memory block; wherein
the number of memory access requests and number of dimensions of the multi-dimensional array are equal to or greater than 2.

12. The non-transitory computer-readable storage medium of claim 11, wherein
the memory access sequence references the second memory block as immediately following the first memory block.

13. The non-transitory computer-readable storage medium of claim 11, further comprising executable instructions causing the processing device to:
responsive to evaluating a triggering condition, updating the memory access tracking data structure by resetting the first sequence counter.

14. The non-transitory computer-readable storage medium of claim 11, wherein
at least one of:
each memory block is provided by one of a memory page, a disk block, or a disk file; and
each the first memory block identifier comprises one of a memory page number, a disk block identifier, or a file name hash.

15. The non-transitory computer-readable storage medium of claim 11, further comprising executable instructions causing the processing device to:
detecting an operational issue associated with a memory accessing agent by evaluating, using the memory access tracking data structure, a memory usage pattern by the memory accessing agent.

16. The method according to claim 1, further comprising
detecting an operational issue associated with a memory accessing agent by evaluating a memory usage pattern by the memory accessing agent in dependence upon the counters stored within the memory access tracking data structure, wherein
the operational issue is selected from the group comprising malware activity, a configuration error, a hardware failure, and a resource usage policy violation.

17. The method according to claim 1, wherein
identifying, based on the memory access tracking data structure, the second sequence counter employs a predictive model;
the further memory access request identifying the further memory block is generated by a virtual machine; and
the predictive model is selected from a plurality of predictive models in dependence of a memory usage pattern of the virtual machine.

18. The method according to claim 1, wherein
identifying, based on the memory access tracking data structure, the second sequence counter employs a predictive model; and
the memory access tracking data structure is established either during a training period or a lifetime of the predictive model.

19. The method according to claim 1, wherein
identifying, based on the memory access tracking data structure, the second sequence counter employs a predictive model;
the further memory access request identifying the further memory block is generated by a virtual machine;
the memory access tracking data structure is established either during a training period observing memory usage of a group of other virtual machines or a lifetime of the predictive model established by the existence of another group of virtual machines of which the virtual machine is one.

20. The method according to claim 1, wherein
identifying, based on the memory access tracking data structure, the second sequence counter employs a predictive model;
the predictive model is refreshed by resetting certain counters of the memory access tracking data structure in dependence upon a triggering condition being met; and
the triggering condition which is met is selected from the group comprising:
  expiration of a pre-defined timeout with respect to a counter or group of counters where the timeout is set every time the counter or group of counters is updated;
  detection of threshold with respect to difference between the predictive model and actual memory usage patterns where the threshold relates to a number of consecutive mispredictions with respect to a counter or group of counters.

* * * * *